US005282145A

United States Patent [19]

Lipson et al.

[11] Patent Number: 5,282,145

[45] Date of Patent: Jan. 25, 1994

[54] METHOD OF REPAIR PAINT CURING FOR PRODUCTION LINES AND APPARATUS

[76] Inventors: Ronald Lipson, 6085 Pickwood Dr., West Bloomfield, Mich. 48322; J. Rick Overdorf, 12398 Hogan Hwy., Clinton, Mich. 49236

[21] Appl. No.: 751,511

[22] Filed: Aug. 29, 1991

[51] Int. Cl.[5] .............................................. G06F 15/46

[52] U.S. Cl. ....................................... 364/477; 34/39; 34/48; 118/642; 427/542

[58] Field of Search ............... 364/477, 400, 140, 141, 364/146, 147, 468; 118/641-643, 669, 696; 34/4, 39, 44-53, 68; 432/45, 51; 427/521, 542; 219/492, 501

[56] References Cited

U.S. PATENT DOCUMENTS

| | | | |
|---|---|---|---|
| 1,638,811 | 8/1926 | Maehler et al. . | |
| 1,646,010 | 7/1923 | Clover . | |
| 2,048,777 | 6/1934 | Brown | 219/34 |
| 2,057,776 | 10/1934 | Groven | 219/45 |
| 2,170,763 | 5/1936 | Ohlson | 34/19 |
| 2,500,872 | 4/1946 | Root et al. | 219/34 |
| 3,667,095 | 6/1972 | Ostrowski et al. | 29/33 D |
| 4,265,029 | 5/1981 | Jenkins | 34/39 |
| 4,416,068 | 11/1983 | Nilsson et al. | 34/39 X |
| 4,621,187 | 11/1986 | Petro, Jr. | 118/642 X |
| 4,662,086 | 5/1987 | Hennecke et al. | 34/229 |
| 4,712,313 | 12/1987 | Gettleman | 34/97 |
| 4,771,728 | 9/1988 | Bergman, Jr. | 118/642 |
| 4,849,598 | 7/1989 | Nozaki et al. | 34/4 X |
| 4,908,231 | 3/1990 | Nelson et al. | 427/55 |

*Primary Examiner*—Joseph Ruggiero
*Attorney, Agent, or Firm*—Dykema Gossett

[57] ABSTRACT

The method of repair paint curing for an automotive production line having a prep area, a spray booth, and an infrared oven, with a plurality of longitudinally spaced infrared heating panels upon its opposite sides and top includes the steps of conveying a vehicle from the prep area into a spray booth, locating upon the vehicle body the prepped area to be painted, and manually inputting a code to a computer control for selectively energizing only one of the heating panels immediately adjacent the prepped area. Additional steps include spray painting the prepped area, indexing the vehicle into the oven, and automatically energizing only the selected heating panel to apply preset heating and drying temperatures to the painted area for preset temperatures and time periods in accordance with a preselected program for the computer for drying and curing the painted area, all of the other heating panels remaining inactive. An apparatus in disclosed to practice the method of repair paint curing.

11 Claims, 2 Drawing Sheets

METHOD OF REPAIR PAINT CURING FOR PRODUCTION LINES AND APPARATUS

FIELD OF THE INVENTION

The present invention relates to repair paint curing for automotive production lines and more particularly to a method of repair paint curing together with apparatus which includes a plurality of infrared heating panels in an oven with limitation in the use of said panels to one or those directly adjacent to the painted area of a vehicle body or other part.

BACKGROUND OF THE INVENTION

Previously in connection with painting and curing for production lines of automotive bodies, after prepping and painting it was necessary to advance the entire vehicle through a conventional predelivery convection oven, usually a gas-type oven where a temperature throughout was maintained at approximately 225° F., for illustration, and wherein often parts of the vehicle were damaged during this heating experience. These parts included shock absorbers, viscosity of the oil, plastic parts, tires, belts and other parts.

Previously the predelivery convection oven maintained a constant temperature throughout its interior exposing all portions of the vehicle to such constant heat during curing and drying of the painted area without regard to the particular areas painted. It required the use of large masses of exhaust flow of air for the removal of paint solvent and for maintaining the environment sufficiently clean to avoid damage to the repaired and painted areas of vehicle bodies.

SUMMARY OF THE INVENTION

An important feature of the present invention is to provide an improved infrared curing oven for use in conjunction with repair paint curing for production lines. The oven includes a plurality of longitudinally spaced inwardly facing heating panels upon and along its opposite sides and at the top thereof. Only the particular oven panel which corresponded to the painted area is energized for the curing and drying operation, with all of the remaining other panels in the oven remaining inactive.

An important feature is to provide an improved infrared oven used in conjunction with the conventional paint spray booth in the repair production line such that the general area surrounding the vehicle moving therethrough is of a reduced temperature. The specific heat needed for curing and drying paint applied to a repair area is extremely limited normally to a single heating panel of a plurality of panels. Only the panel directly adjacent to the repaired and painted area is used in the present improved infrared paint repair and curing and drying oven. Vehicle parts, including shock absorbers, oil viscosity, plastic parts, tires, belts and other parts are not exposed continuously to such temperatures as are necessary for drying and curing of a painted area.

As another feature of the present invention there is provided a programmed temperature and timing computer controlled means of applying particular heat temperatures for a particular time period in accordance with a preset program directed to a specific heating panel for an adjacent painted area.

Another feature incorporates the use of infrared paint curing as a faster method of treating painted areas and conveying heat energy to a surface to heat it quickly. In the case of transfer by radiation the interchange of energy is very nearly proportional to the fourth power of the temperature difference and directly proportional to the radiating area. Sheet metal surfaces which are large but contain small mass absorb radiant energy rapidly.

Another feature incorporates in the present heating panels optical temperature sensors, or optical pyrometers, in conjunction with a computer controlled SCR proportional unit sometimes referred to as analogue output lamp controller. Such controller maintains a surface temperature on a work piece, plus or minus 5°, from a desired set point in accordance with a predetermined program for the computer.

As another feature, the present infrared curing oven uses much less space than conventional convection ovens and requires much less energy.

In accordance with the present invention only surfaces which are directly in front of radiant heat are heated. Plastic parts and tires and all other parts and other areas of the vehicle are remote from the source of heat so that heating is entirely selective to the area painted.

As another feature because infrared curing requires much less space than conventional convection ovens, a very small amount of air movement is required to remove evaporated solvents. With less air movement there is generally less dirt problems which normally adversely affect painted areas.

Another feature is to provide in the method of repair paint curing for automotive production lines utilization of a pre-existing prep area as well as a pre-existing spray booth together with an infrared oven with a plurality of longitudinally spaced infrared heating panels within the oven upon its opposite sides and top.

A further feature includes conveying a vehicle having a body from the prep area into the spray booth and thereafter locating upon the vehicle body the prepped area to be painted. This is followed in the present method by manually inputting a code to a computer control for selectively energizing only one or possibly two of said heating panels immediately adjacent said prepped area. Further steps include spray painting of the prepped area and thereafter indexing the vehicle into the oven and automatically energizing only the selected heating panel to apply preset heating and drying temperatures to the painted areas at preset temperatures and for time periods in accordance with a preselected program for said computer. This is for evaporating solvent and successively drying and curing the painted area and wherein all the remaining panels remain inactive.

As another feature the present infrared oven may consist of one or a plurality of zones and wherein each heating zone has its own set of longitudinally spaced heating panels on its opposite sides and top. The vehicle is indexed selectively into one of the plurality of zones for a particular heating and curing purpose. In accordance with the computer control only the preselected panel required for drying the painted area in the selected zone will be energized. All other unselected panels in the selected zone and unselected zones remain inactive.

Another feature of the present invention includes an apparatus which includes an existing spray booth receiving a vehicle having a prepped body area to be painted together with an infrared oven aligned therewith and having a plurality of longitudinally spaced inwardly facing heater panels upon its opposite sides and upon the top thereof together with a conveyor means for supporting the vehicle in the spray booth and extending through the oven for indexing the vehicle from the prep area into the spray booth and successively into an oven.

The apparatus further includes a computer or programmed computer (PC) having at least one program for selecting a predetermined temperature for a selected time or time periods for a preselected heating panel. The PC controls an analogue output lamp controller electrically connected to the respective heating panels. A manual push button control is employed for selecting in advance from the spray booth one of the respective heating panels which will be directly adjacent to the prepped part to be painted. The computer control inputs selectively through the computer connection to the said panels for energization only the panel directly adjacent to the painted area of the vehicle body. All remaining electrical heating panels remain inactive. The selected panel for a particular zone of the infrared oven is maintained at preselected temperatures and for preselected time periods in accordance with a preselected program for said computer.

A further feature includes an optical pyrometer built into each of the heating panels and with a feedback lead to the computer assuring that the programmed temperature is accurately maintained at the selected heating panel in accordance with said program and wherein the program computer regulates the analogue output lamp controller regulating electrical power to the selected panel.

These and other features and objects will be seen from the following specification and claims in conjunction with the appended drawings.

THE DRAWINGS

Figure 1:
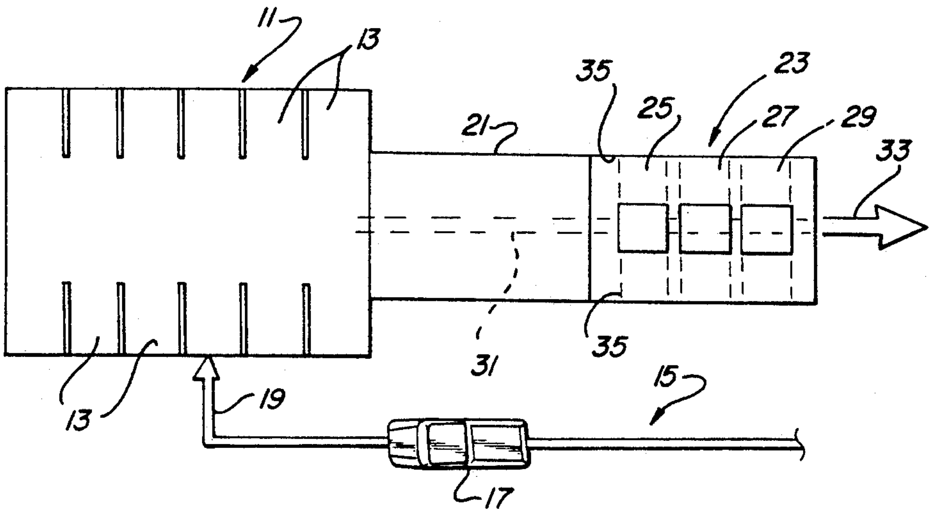
FIG. 1 is a schematic plan view of a repair paint curing production line including a prep area, an existing spray booth and an infrared oven.

It will be understood that the above drawings are merely illustrative of an embodiment of the invention, and that other embodiments are contemplated within the scope of the claims hereafter set forth.

DETAILED DESCRIPTION OF AN EMBODIMENT OF THE INVENTION

Referring to the drawings FIGS. 1-4 in connection with the present method of repair paint curing for automotive production lines there is employed an existing prep area 11 for vehicle body repair having a series of delineated vehicle areas 13. These receive vehicles 17, FIG. 1, including a body requiring some nature of prepping for repaint purposes. As is conventional there is an existing prep line conveyor 15, schematically shown, which terminates in a pathway 19 by which the vehicle is moved into the prep area 11 and into one of the areas 13 f or prepping such as the repair of a body area and, ready for painting.

Adjacent to and in communication with prep area 11 is the conventional or existing paint spray booth 21. In line and in communication therewith is an infrared oven 23. In the illustrative embodiment said oven includes three longitudinally spaced heating zones 25, 27 and 29 schematically shown. These are respectively referred to hereafter as zones 1, 2 and 3 for selective use as desired.

Further in accordance with the present method, there is employed an existing centrally arranged conveyor 31 schematically shown which extends centrally and longitudinally of the existing spray booth 21 and through infrared oven 23 to the vehicle exit 33.

Figure 2:
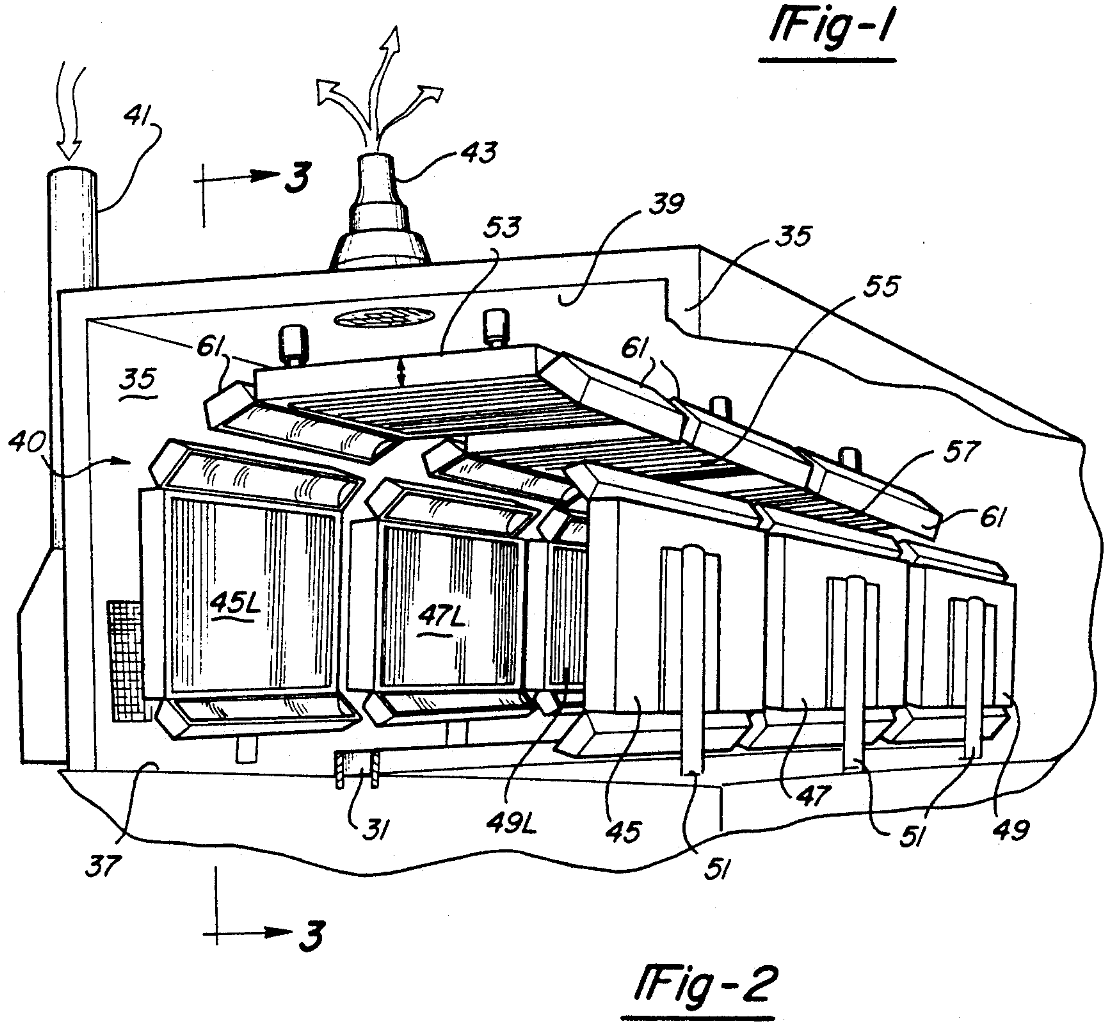
FIG. 2 is a front perspective view of one infrared oven with one side wall broken away and on an increased scale.

The infrared oven 23 of which there are three heating zones 25, 27 and 29 in the present embodiment, includes a pair of opposed upright sidewalls 35 upon a floor surface 37, FIG. 2, and a top wall 39. Said walls define a tunnel 40 to receive successively the vehicle bodies which have been prepped and spray painted respectively in the areas 11 and 21, FIG. 1.

As schematically shown in FIG. 2 there are provided one or more upright air intake vent pipes 41 which communicate at their lower ends with the lower interior portions of tunnel 40. Arranged upon the top of said tunnel along top wall 39 are a plurality of spaced air blower outlets 43. These affect such sufficient air movement from the tunnel as is required to remove the evaporated solvents, and other airborne particles.

Since infrared curing can be done in much less space than in conventional convection ovens, the area or volume of tunnel 40 is generally reduced. As there is less air movement through and outwardly of the tunnel there are less dirt problems which might otherwise adversely affect painted areas during the drying arid curing process.

Each of the respective zones 1, 2 and 3 corresponding to the infrared oven units 25, 27 and 29 have therein the inwardly facing longitudinally spaced infrared panels 45, 47, 49, and 45L, 47L and 49L arranged upon opposite sides of the oven adjacent and upon the panel supports 51. Each zone includes a corresponding plurality of longitudinally spaced inwardly facing top infrared panels 53, 55 and 57. These respective heating panels for the individual Zones 1, 2 and 3 are schematically shown for convenience by the numbers 1-9, FIG. 4, in order to match the correspondingly numbered code buttons 1-9 shown on the control panel 83 in the electrical circuit 65, FIG. 4. Said panel is normally located within spray booth 21.

The longitudinally spaced top panels or horizontal emitter heads 53, 55 and 57 depend from corresponding longitudinally spaced supports 59 which depend from top wall 39 of oven 23. Panel holder 60 adjustably extends from supports 59. This provides for vertical adjustment of top panels 53, 55 and 57 if needed, FIG. 3. Curing or drying a horizontal panel, such as a truck bed, can be accomplished by increasing electrical power. This enables the infrared to reach further distances, i.e. increased rowing power. This also can be accomplished by mechanically moving the horizontal emitter head 57 up or down.

A series of spaced inwardly facing deflectors 61 are employed for completing the enclosure and heat tunnel 40 through which the prepped and painted vehicle body moves along conveyor 31, FIGS. 1 and 2.

Figure 4:
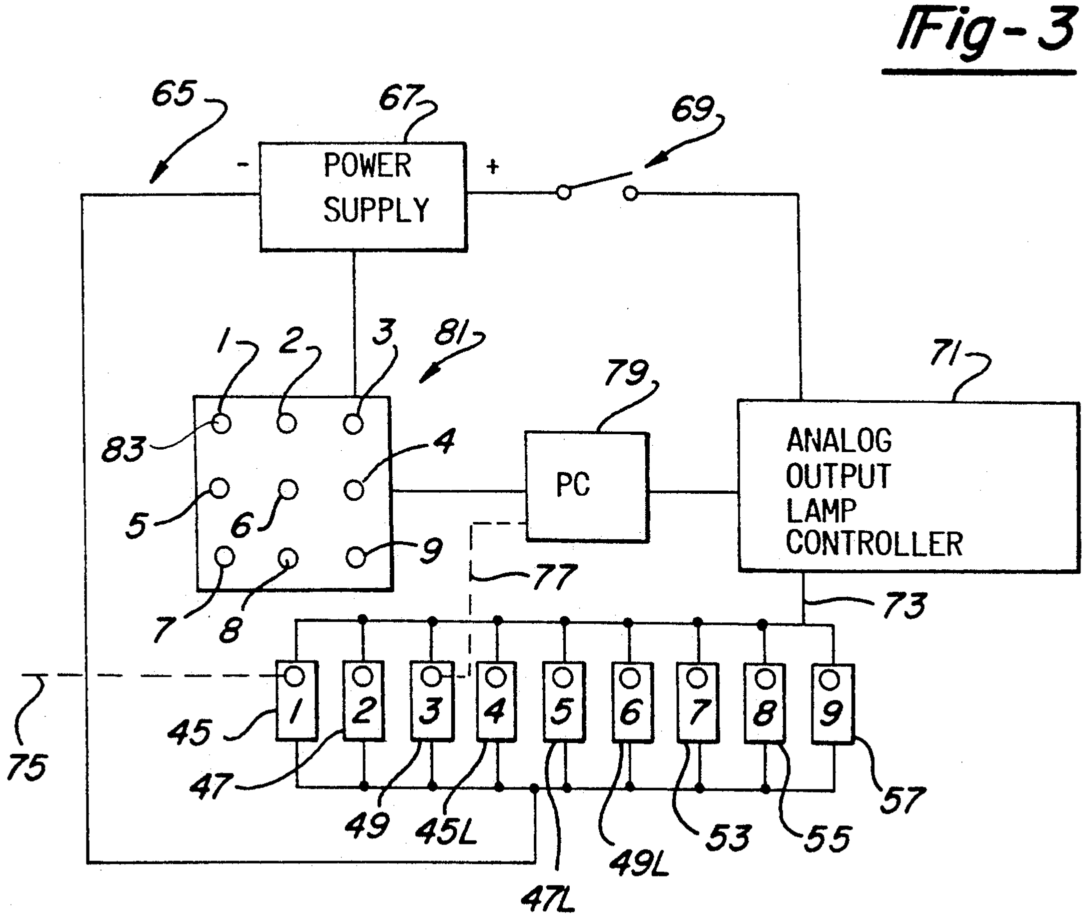
FIG. 4 is a schematic diagram of an illustrative power circuit between the code input control, the PC and the analogue output lamp controller to the heating panels with a power source.

There is schematically shown in FIG. 4 a simplified electrical circuit 65 which includes a power source 67 connected to off/on switch 69 and directly to the analogue output lamp controller 71. It is contemplated that any other suitable controller operated by the computer 79 could be employed for regulating the amount of heating power delivered selectively through the cable lead 73 to the individual heating panels 1–9.

The illustrative PC 79 is a product that is available on the market and may be purchased from Kwik Paint Products whose address is 7455 Neuman Boulevard, Dexter, Mich. 48138. It is also supplied by Octogan Systems Corporation, 6510 West 91st Avenue, Westminister, Colo. 80030, Model No. SBS2300.

The analogue output lamp controller 71 forming a part of the schematic circuit 65 is another item which may be purchased on the market from Douglas Randall whose address is 6 Pawcatuck Avenue, Pawcatuck, Conn. 06379. Its detail of operation is not repeated except that it is schematically shown and is connected into the circuit 65 directly to and selectively to the heater panels 1–9 under the control of one or more of the preselected computer programs for the PC 79. The control panel 81 containing the buttons 1–9 corresponding to the respective heating panels for each of the zones 1, 2 and 3 of the infrared oven is connected in the circuit to PC 79. This control panel is available on the market and may be purchased from: Kwik Paint Products, whose address is 7455 Newman Blvd., Dexter, Mich. 48138,.

Figure 3:
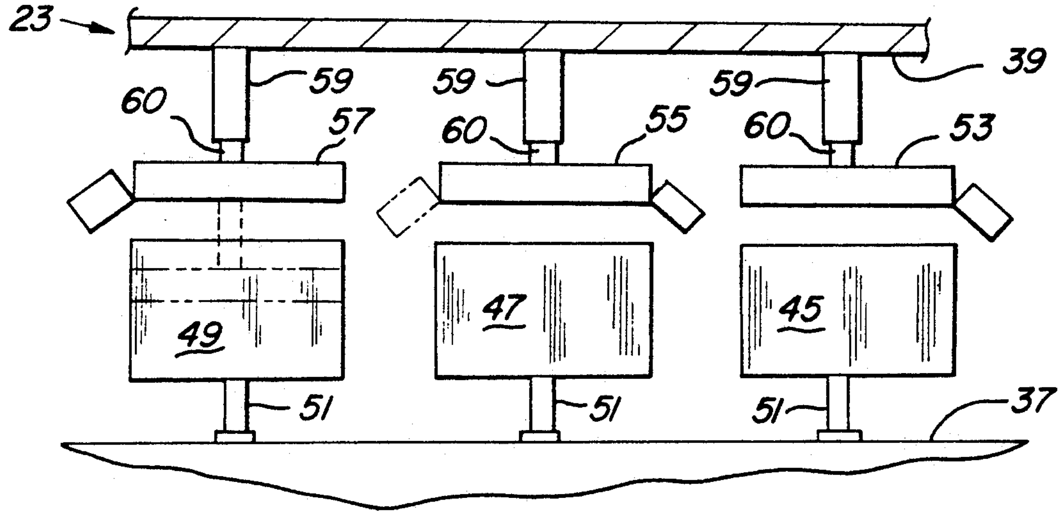
FIG. 3 is a schematic inside elevational view of the oven facing the side opposite that of FIG. 2.

The cable 73, FIG. 4, includes a series of individual leads directed to the respective heater panels 1–9 also referred to as the heating panels 45, 47 and 49, 45L, 47L, 49L, 53, 55 and 57, as partly shown in FIGS. 2 and 3. The respective cable elements are directed to their respective heating panel so that under the code input from the control panel 81 and the push buttons 1–9 corresponding to the identified panels 1–9, and under the control of the PC 79 the appropriate heat energy to only one of the preselected panels will be activated through the corresponding lead to the individual panel. The remaining heating panels will be deenergized during the heating and curing cycle for the painted area. Selectively an additional panel or panels may be connected for additional painted areas.

Each of the respective heating panels 1–9 includes thereon all optical pyrometer 75 with a feedback lead 77 respectively to PC 79, one of such leads being shown. There is thereby maintained through optical temperature feedback a uniform heating temperature in accordance with a preselected program for the computer 79.

The optical pyrometer provides an instantaneous measurement of the heating temperature at the heating panel as directed to the painted body part to be dried or cured. The feedback lead 77 to the PC provides a comparison for verifying that the power output from controller 71 will be modified so as to maintain a substantially constant heating temperature at the selected panel based upon the program setting for the predetermined temperature requirements for the program involved.

Control panel 81 is included in the circuit 65 receiving power from electrical power source 67, such as 220 volts. It is connected to PC 79 and includes the code buttons 1–9 schematically designated in FIG. 4. These are used in accordance with the method of operation hereunder described.

Heating by radiation particularly infrared, is largely dependent upon radiation of those wave lengths situated in the "infrared region of the spectrum" and longer than those normally visible to the human eye, i.e. wave lengths longer than about 7,000A.

By radiation it is possible to convey a great deal of energy to the surface to be heated quickly. Interchange of energy is nearly proportional to the fourth power of the temperature difference and directly proportional to the radiating area. The sheet metal surfaces which are large but contain small mass absorb radiant energy rapidly.

By utilizing optical temperature sensors 75, sometimes referred to as optical pyrometers, and a computer controlled SCR proportional unit as controller 71 a surface temperature at the body +/−5° from the desired set point may be obtained. Infrared curing can be done in much less space than conventional convection ovens.

The only surfaces which are directly in front of radiant heater unit at the oven are heated. Spot repair with a 38 inch by 16 inch radiant unit utilizing T3 bulbs 2 inches on center cost approximately 9¢ per repair. This is based upon 7¢ KWH energy costs provided by Norris Caudill and Ed Szkola, engineers at Ford Motor Company, Michigan Truck Plant. Full panel repairs with a 6 foot by 6 foot radiant unit utilizing T3 bulbs 2 inches on center would cost approximately 29¢ per panel. This is illustrative of the low cost of repair utilizing the current method.

Generally stated the method utilized in the present invention includes the following: vehicle 17 including its body would be prepped in a presently available prep area 11, FIG. 1, and the vehicle would be placed upon conveyor 31. The conveyor control logic would be adjusted to index the units through each of the respective zones from the spray booth 2 and through infrared oven 23 to exit 33.

The vehicle body would be sprayed in the existing spray booth 21, FIG. 1.

The sprayer in booth 21 would input a code utilizing the code buttons 1–9 on the control panel 81 shown in the circuit 65, FIG. 4, for a particular area on the vehicle which has been prepped or repaired and is ready for painting. After painting a button is pushed for the conveyor to index the vehicle from the spray booth into one of the three heating zones 25, 27 and 29 of the infrared oven generally designated at 23, FIG. 1.

Dark colors (black or brown) absorb infrared quicker than light colors (white, silver). Therefore Dark colors will cure faster. The operator (painter) will input the repair panel to be cured and the color of paint which will determine temperature of cure. This information will be preprogrammed to reflect the different temperature Parameters by color.

When the vehicle and body as painted are in one of the zones 25, 27 or 29, only the heating element 1–9 of FIG. 4 required for paint curing would be energized.

The vehicle 17 would index to the infrared oven 23 designated by one of the zones 25, 27 or 29. A heater panel 53, 55, or 57 for a hood or truck bed would be lowered into position if required for repair done.

The infrared section for the repair done would cycle on and bring the temperature to preset in accordance with the preselected program for computer 79. Under the control of computer 79 and through the analogue output lamp controller 71 a programmed temperature would be maintained by varying power input to the lamps for any selected heating panel immediately adjacent to a prepped area which has been previously painted. Optical temperature feedback is utilized as by the optical pyrometer 75 with feedback 77 to the PC 79, thereby maintaining a uniform heating temperature corresponding to the programmed temperature.

The period of time at a particular zone would be determined by the number of zones employed and the repair per hour requirements.

a) Up to eight jobs per hour two zones 25 and 27 utilized for illustration at 7½ minutes at each zone.

b) Up to twelve jobs per hour all three zones 25, 27 and 29 utilized at 5 minutes at each zone.

The infrared heating zones 25, 27 and 29 are housed in a clean, tunnel 40, FIGS. 2 and 3, with air movement therethrough to meet IRI requirements.

The present method of repair paint curing for automotive production lines includes an online prep area 11, a spray booth 21 and an infrared oven 23, with a plurality of -heat zones 25, 27 and 29. Each zone includes a plurality of longitudinally spaced infrared heating panels 1-9, FIG. 4, upon its opposite sides and top. The method comprises the following steps:

1) Convey a vehicle 17 having a body from the prep area 11 into the spray booth 21;

2) locating upon the vehicle body the prepped area to be painted;

3) manually inputting a code 1-9 to the computer control 81 and through the PC 79 and the analogue output lamp controller 71, FIG. 4, and the respective electrical lead 73 and circuit 65 to the respective panels 1-9 for selectively energizing only one of the said heating panels immediately adjacent to said area;

4) spray painting said prepped area at 21 and indexing conveyer 31 to advance the vehicle into oven 23 and into one of the heating zones 25, 27 or 29; and 5) automatically energizing only the selected heating panels 1-9 to apply preset heating and drying temperatures to said painted area for preset temperatures and time periods in accordance with a preselected program for said computer for evaporating solvent and successively drying and curing said painted area, and wherein all the other remaining heating panels 1-9 remain inactive.

For each of the infrared oven zones 25, 27 and 29 there will be a series of longitudinally spaced inwardly facing heating panels on opposite sides and upon the top of the particular zone or oven unit. Therefore depending upon the particular heating zone utilized for the drying and/or curing of the painted area and whichever one is selected in accordance with a predetermined usage of the respective zones 25, 27 and 29, only the one heating panel for that particular zone will be electrically energized in accordance with the circuit shown in FIG. 4. This is for the heating and drying of the painted area at predetermined temperature or temperatures in accordance with a preselected program for PC 79 or any secondary temperatures and for predetermined time periods in accordance with said program. If two separate areas or more are painted, then additional adjacent heater panels will be energized.

If the drying and curing of a painted area is to be in two stages and to occur in different heating zones, the vehicle 17 and its body are conveyed from zone 1 for example to zone 2 or zone 3. Increased heat for a predetermined time period may be applied to a particular heating panel in the additional zone corresponding to only the repaired area and wherein all the remaining panels of all the units otherwise remain inoperative.

In the event the prepped vehicle and body 17 have more than one area then the control panel 81 and the respective buttons 1-9 at 83 corresponding to the areas prepped and to be painted will be coded in at panel 81. This controls through PC 79 and controller 71 the energization of the corresponding pair of panels directly adjacent the prepped areas which have been or are to be painted for drying and curing.

The present invention additionally includes apparatus in the combination which includes spray booth 21 for receiving a vehicle 17 and having a body which has been prepped as in the area 11 which is to be painted in a preselected area and infrared oven 23 aligned therewith. Said oven includes a plurality of longitudinally spaced inwardly facing heating panels 1-9, FIG. 2, upon its opposite sides and top within said oven. A conveyor 31 is provided for supporting a vehicle body in the spray booth. Said conveyor extends through said oven for advancing said vehicle into said oven. A computer having at least one program for selecting a predetermined temperature for a preselected time period for a preselected panel is employed together with electrical energy controller such as the present analogue output lamp controller 71 in the circuit 65, FIG. 4. This is connected by a cable 73, and individually to the respective heating panels 1-9 for selective control to one of the respective heating panels. There is included a computer control for inputting selectively by the push button controls to one of said panels corresponding to the body area prepared for painting. After painting the prepped area the vehicle body is advanced to said oven and the heating panel directly adjacent said painted area is energized for a preset time and temperature in accordance with said program for curing and drying said paint and wherein all the other heating panels remain inactive.

The PC 79 may have in memory one or a plurality of programs depending upon particular conditions and jobs and wherein different du temperatures may be desired for different time periods and may be prescheduled or preprogrammed in accordance with the operations of the present method and apparatus. In the operation of the computer it is presumed that one of a plurality of programs have been preselected for computer operation for a particular job or series of units passing through the paint repair production line.

Having described our invention reference should now be had to the following claims.

We claim:

1. The method of repair paint curing for an automotive production line having an on-line prep area, a spray booth, and an infrared oven, with a plurality of longitudinally spaced infrared heating panels upon its opposite sides and top comprising:

conveying a vehicle having a body from said prep area into said spray booth;

locating upon the vehicle body the prepped area to be painted;

manually inputting a code to a computer control for selectively energizing only one of said heating panels immediately adjacent said prepped area;

spray painting said prepped area;

indexing a conveyor to advance the vehicle into said oven; and automatically energizing only the selected heating panel to apply preset heating and drying temperatures to said painted areas for preset temperatures and time periods in accordance with a preselected program for said computer for evaporating solvent and successively drying and curing said painted area, all of the other heating panels remaining inactive.

2. The method of repair paint curing for an automotive production line having an in-line prep area, a spray booth, and an infrared oven with a plurality of longitudinally spaced heating panels upon its opposite sides and top comprising;

conveying a vehicle having a body from said prep area into said spray booth;

locating upon the vehicle body the prepped area to be painted;

manually inputting a code to a computer control for selectively energizing only one of said heating panels immediately adjacent said prepped area;

spray painting said prepped area;

indexing a conveyor to advance the vehicle into said oven; and automatically energizing through a computer only the selected heating panel for applying a preset heating temperature to said painted area for a preset time period in accordance with a preselected program, to evaporate the paint solvent and successively applying an increased heating temperature to said panel for a preset time period in accordance with said program, for drying and curing said painted area, all of the other heating panels remaining inactive.

3. In the method of claim 2, said oven having one to three inline heating zones with said plurality of heating panels in each zone, further comprising the intermediate step before the second heating step of indexing the conveyor for advancing the vehicle from a first zone to a second zone; and successively automatically energizing the corresponding single panel of the second zone for curing and drying said painted area.

4. The method defined in claim 2, further comprising locating upon the vehicle body an additional prepped area to be painted;

manually inputting a code to a computer control for selectively energizing an additional heating panel immediately adjacent said additional prepped area; and wherein after painting said additional area, and indexing the vehicle into the oven the respective oven panel adjacent said additional area is energized in accordance with a preselected program.

5. The method of repair paint curing for an automotive production line having a prep area, and an inline spray booth and an infrared oven, having a plurality of heating panels, comprising:

conveying a vehicle having a body from said prep area into said spray booth;

locating upon the vehicle body the prepped area to be painted;

manually inputting a code to a computer control for selectively energizing only one of said heating panels immediately adjacent said prepped area;

spray painting said prepped area;

said infrared oven having a plurality of longitudinally spaced heating zones;

each zone having a plurality of longitudinally spaced inwardly facing heating panels upon its opposite sides and top;

indexing a conveyor to advance the vehicle into one of said heating zones; and automatically energizing only the selected heating panel for the selected zone to apply preset heating temperatures respectively for time periods in accordance with a preselected program to dry and cure said painted area, all the other panels of said selected zone and in selected zones remaining inactive.

6. In combination, a spray booth receiving a vehicle having a prepped body to be painted in a preselected area and infrared oven aligned therewith;

a plurality of longitudinally spaced inwardly facing heater panels upon its opposites sides and top within said oven;

a conveyor for supporting said vehicle and body in said spray booth and extending through said oven for advancing said vehicle into said oven;

a computer having at least one program for selecting a predetermined temperature for a selected time period for a preselected panel;

an analogue output lamp controller connected to said computer and having an output connected selectively to one of said heater panels corresponding to the body area prepped for painting; and a computer control for inputting to said computer selectively the heater connection to any one of said panels corresponding to the body area prepped for painting;

whereby after painting, the vehicle body is advanced into said oven and wherein only the heating panel directly adjacent to said painted area is energized for a preset temperature and time in accordance with said program for curing and drying said painted area, and wherein all the remaining heating panels remain inactive.

7. In the combination defined in claim 6, further comprising an optical pyrometer connected into each heating panel and respectively connected to said computer for an automatic feedback to said computer to maintain a heat output at the selected heating panel corresponding to said programmed temperature.

8. In the combination defined in claim 6, further comprising said infrared oven including a plurality of adjacent heater zones; and each zone including a series of longitudinally spaced inwardly facing heating panels upon its opposite sides and to and wherein said programmed computer respectively connects only the single panel for a selected zone and wherein all the other panels of said zone and unselected zones remain inactive.

9. In the combination defined in claim 6, an electrical circuit including a power source connected to said analogue output lamp controller;

all of the heating panels being selectively connected to said lamp controller in said circuit; and a push button control connected to said computer and having a series of in code inputs corresponding to each of said heating panels, whereby only one heating panel is selected for computer controlled energizing.

10. In the method defined in claim 1, vertically adjusting a preselected top heating panel for a preset center distance to a truck bed or hood.

11. In the combination defined in claim 6, adjustable means suspending the respective top heater panels from the top of said oven for moving a selected panel towards and away from a truck bed or hood.

* * * * *